United States Patent [19]

Becker

[11] Patent Number: 5,460,411
[45] Date of Patent: Oct. 24, 1995

[54] FENDER FOR COOLING TIRES AND BRAKES AND TO CONTROL SPRAY

[75] Inventor: John H. Becker, Sumter, S.C.

[73] Assignee: Air Fenders Ltd., New Brunswick, Canada

[21] Appl. No.: 180,048

[22] Filed: Jan. 11, 1994

[51] Int. Cl.⁶ ........................................ B62B 9/16
[52] U.S. Cl. .............................. 280/851; 280/848
[58] Field of Search ................... 280/851, 849, 280/848, 152.05

[56] References Cited

U.S. PATENT DOCUMENTS

| | | | |
|---|---|---|---|
| 2,700,553 | 1/1955 | Ludwig et al. | 280/848 |
| 3,341,222 | 9/1967 | Roberts | 280/851 |
| 3,834,732 | 9/1978 | Schons | 280/851 |
| 4,205,861 | 6/1980 | Roberts et al. | 280/851 |
| 4,325,563 | 4/1982 | Brandon et al. | 280/851 |
| 4,334,694 | 6/1982 | Iwanicki | 280/851 |
| 4,362,310 | 12/1982 | Goodall | 280/157 |
| 4,372,570 | 2/1983 | Goodall | 280/851 |
| 4,377,294 | 3/1983 | Lockwood et al. | 280/851 |
| 4,436,319 | 3/1984 | Clutter | 280/851 |
| 4,445,700 | 5/1984 | Schroeder | 280/851 |
| 4,585,242 | 4/1986 | Sparks | 280/851 |
| 4,660,846 | 4/1987 | Morin | 280/851 |
| 4,858,941 | 8/1989 | Becker | 280/851 |
| 5,100,177 | 3/1992 | Becker | 280/851 |

FOREIGN PATENT DOCUMENTS

| | | |
|---|---|---|
| 1575907 | 7/1969 | France . |
| 7822198 | 7/1978 | France . |
| 297829 | 3/1930 | Germany . |
| 2025519 | 12/1971 | Germany . |
| 2524344 | 9/1976 | Germany . |
| 3826081 | 2/1990 | Germany ........................ 280/848 |
| 473134 | 6/1952 | Italy . |
| 1553432 | 1/1988 | U.S.S.R. ......................... 280/851 |
| 1584453 | 2/1981 | United Kingdom . |
| 2144690 | 3/1985 | United Kingdom . |
| 2165508 | 4/1986 | United Kingdom . |

*Primary Examiner*—Brian L. Johnson
*Assistant Examiner*—Min Yu
*Attorney, Agent, or Firm*—Samuels, Gauthier & Stevens

[57] ABSTRACT

A fender for a rotating tire. The fender has a leading section with parabolic shape vanes which control and discharge downwardly spray cast from the tire. A side shield is spaced apart from the upper half of the tire. The shield has specially dimensional louvers which ensure that the flow rate of the air therethrough is uniform as discharged from the shield to cool the tire and brake assembly.

11 Claims, 4 Drawing Sheets

FENDER FOR COOLING TIRES AND BRAKES AND TO CONTROL SPRAY

BACKGROUND AND BRIEF SUMMARY OF THE INVENTION

The nation's highways provide a means whereby millions of trucks-trailer transports and the like are freight carriers and move a majority of cargo and commodities from one point to another.

There is no suitable device installed over or around the wheels of these transports to prevent the generation and dispersement of finely divided water streams or snow mists during a storm, which in turn are thrown sideways into the path and windshields of vehicles using the passing lane (or vehicles being passed). As a result thousands of highway deaths occur each year and unlimited risks are taken by these motorists to themselves as well as others in the immediate vicinity. (Highway safety reports 40,000 deaths occur each year).

The present invention is directed to a fender design which serves multiple purposes. One object is to cool the tires and brake assemblies. When the carriers are not traveling under rainy conditions and are traveling in warm to hot climates, the tires tend to heat excessively, resulting in reduced tire life. For example, if ambient temperature is 95° F., the temperature of the tire can be as high as 160° F. Further, under these conditions, the brake assemblies are also at a relatively higher elevated temperature and do not function as effectively as they would at ambient temperature. Accordingly, the present invention embodies a fender design which cools the tires and brake assemblies when the tires are operating at relatively hot ambient temperatures.

Another object is to reduce or eliminate the spray generated by the rotating tires under wet conditions.

It is believed that the closest prior art is best exemplified by my earlier issued U.S. Pat. Nos. 4,858,941 issued Aug. 22, 1989 and 5,100,177 issued Mar. 31, 1992. These patents teach fender designs which partially encase the rotating wheels of a moving vehicle and comprise a front plate with openings and/or a top plate and/or a back plate having either openings or vanes and optionally a side plate having louvered openings. Also relevant is Italian Patent 473134 which teaches louvered openings on a fender wall.

In the design of my original fenders, the primary intent was to prevent or inhibit the spray which would be cast up and laterally outward by the rotating wheels when traveling under rainy conditions. A subsidiary aim or objective of the prior fenders was to cool the tires and brake assemblies areas to enhance the life of the tires and brake assemblies.

Although my prior designs were generally satisfactory for the then intended primary objective, namely reducing or eliminating spray, they were not fully effective for either controlling the spray or for cooling the rotating tire and brake assembly.

With my prior fender designs, it was found that under certain road conditions, namely moderate to heavy rains and low to moderate speeds, that the force of the water spray centrifugally cast from the front upper quadrant of the rotating tire was so great that it was cast through the openings in the forward portion of the fender with the result that the spray was not minimized or inhibited as expected.

Further, it was found that only the forward portion of the fender was fully effective in both cooling the forward portions of the tire and brake assembly. Analysis of the fluid flow characteristics of the air flow within the control zone defined by the fender confirmed that there was little or no effective cooling action on the rearward portion of the tire or brake assembly. By control zone is meant the area defined by the inner surface of the fender and the portion of the rotating tire within the fender and the outer surface of the brake assembly.

One aspect of the invention embodies a leading section of a fender which includes parabolic-like-shaped blades to ensure that the air flow into the upper leading quadrant of the rotating tire is sufficient to control the spray and to cool the tire and brake assembly. Further, the blades are designed to entrap spray cast forwardly from the rotating tire by centrifugal force and to redirect that spray downwardly. In this aspect of my invention, the blades control the air flow and collect and control the spray contacting the inner surface of the blades. Each of the blades has a leading edge and curved upper and lower outer surfaces. The opposed surfaces of adjacent blades define a flow path which ensures that the velocity of the air flowing therethrough is greater than the force of the spray cast from the rotating tire. The spray cast from the rotating tire is not cast through the openings under normal operating conditions. The concave inner surface of the blade terminates in a baffle. The spray cast onto the inner surface coalesces, is sheeted off the edge of the baffle and ultimately is discharged inwardly and downwardly from the fender.

In another aspect of the invention, an enlarged scoop section is formed on the upper leading portion of the leading section of the fender. In a preferred embodiment, with a pair of fenders, this scoop portion can be used on one or both fenders.

In still another aspect of the invention, an apertured side wall is secured to the leading section or to the wall of a moving van. The side wall is designed to ensure that substantially the upper half of the tire and brake assembly is uniformly contacted by cooling air streams. The side wall is characterized by slot-like apertures which are specifically proportioned to ensure uniform air distribution within a control zone. This results in longer tire life and longer life for brake assemblies. Further, it also results in much more efficient control of the spray cast by the rotating wheels than with my prior designs.

Tractor trailers, including the spatial relationship between the wheels and the carriages which they support, assume many configurations. There are what is referred to a dry box trailers (vans) which when loaded the carriage may only be 3 to 4 inches above the top of the rotating tires. There are flat bed trailers where there is usually a substantial clearance between the top of the tire and the underside of the carriage even when fully loaded. There are moving vans (trailers) where typically the tire rotates within a wheel well formed within the carriage of the van or busses. There are also trailers which are in essence tanks supported on a carrier for transporting gas, oil, etc. Because of all these various configurations, one or all aspects of my invention may be used in combination with any of these trailers. That is, embodiments of only the leading section, the leading section and the side wall, the side wall (i.e. the wheel well of a bus), the side wall, a side wall and a trailing section in combination can be used alone or in combination with or without a top which top in and of itself may or may not have an air scoop formed therein.

Figure 1:
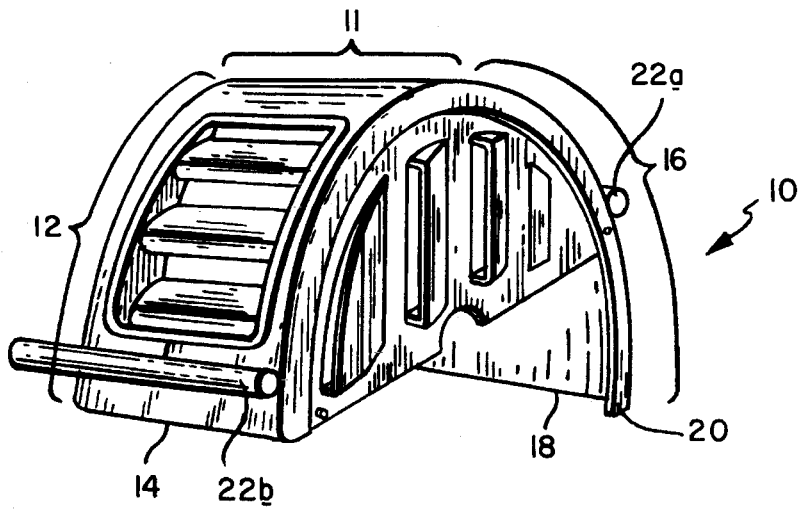
FIG. 1 is a perspective view of a fender embodying the invention for a single axle wheel.
Figure 6:
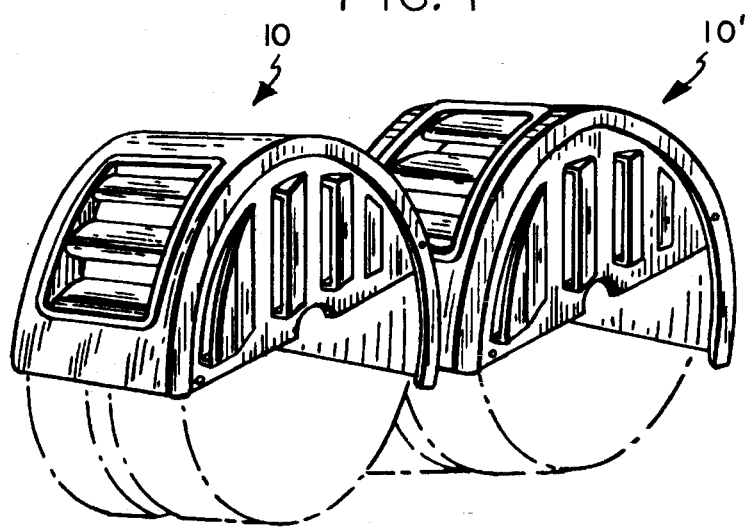
Figure 4:
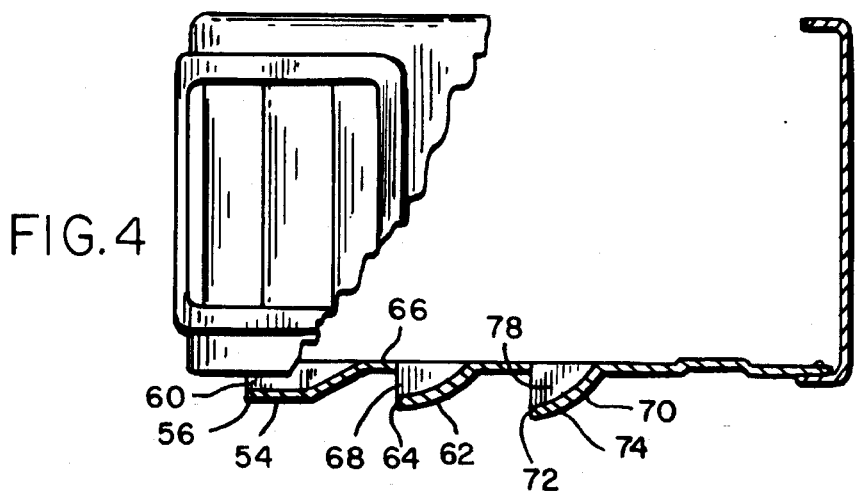
Figure 7:
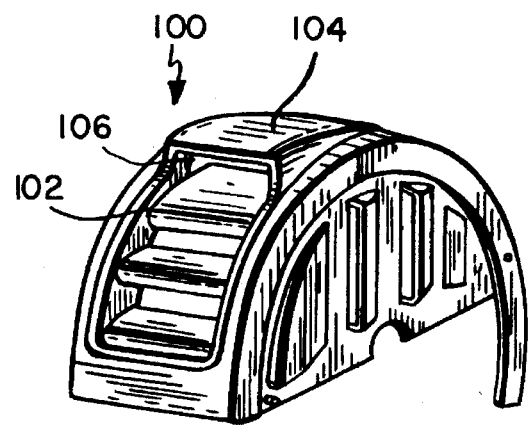
Figure 2:
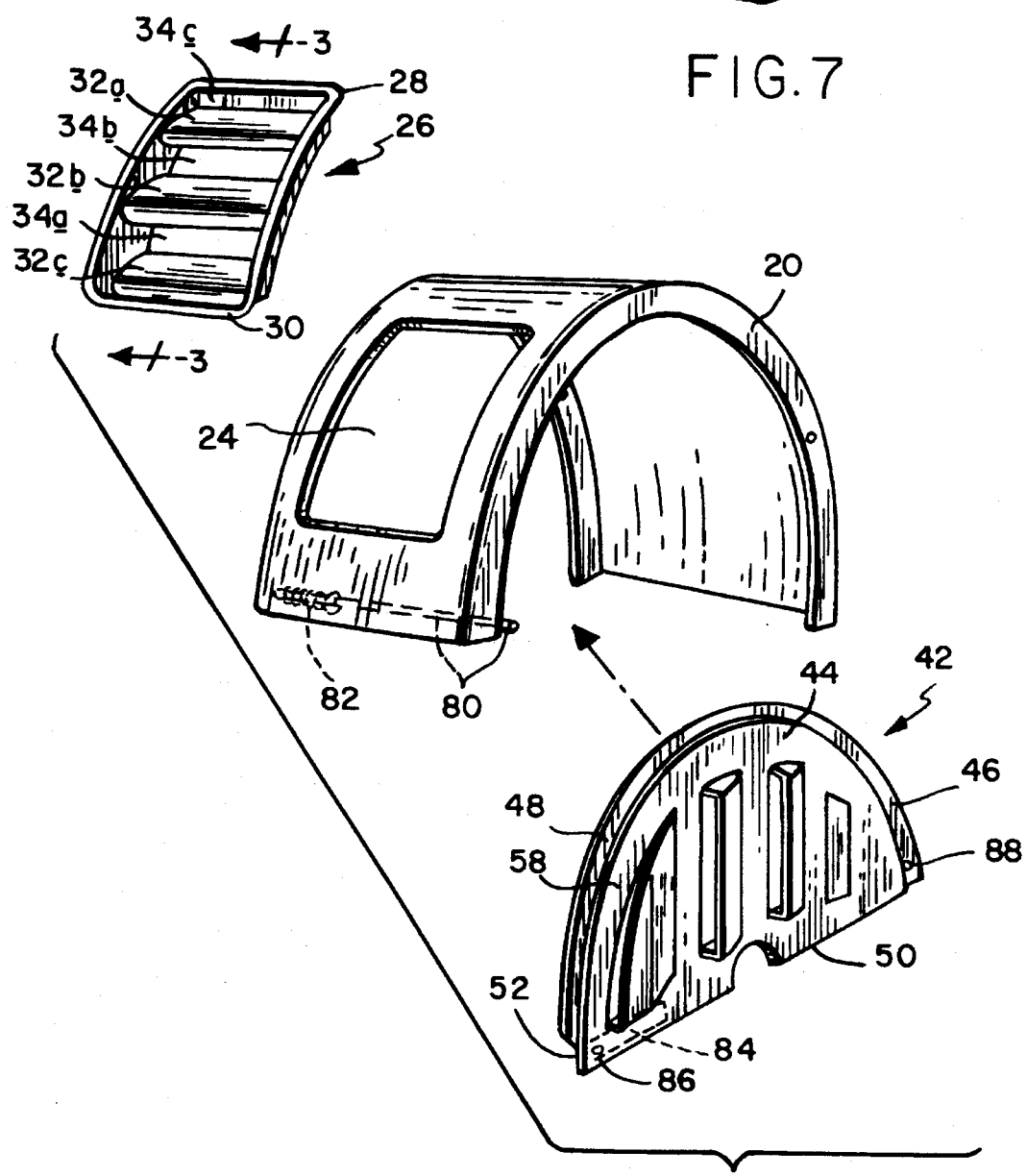
FIG. 2 is an exploded view of the fender.
Figure 5:
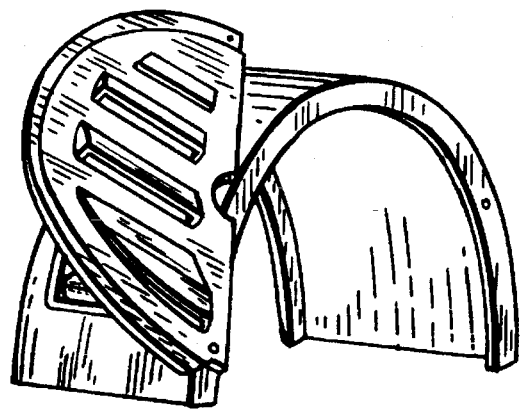
Figure 8:
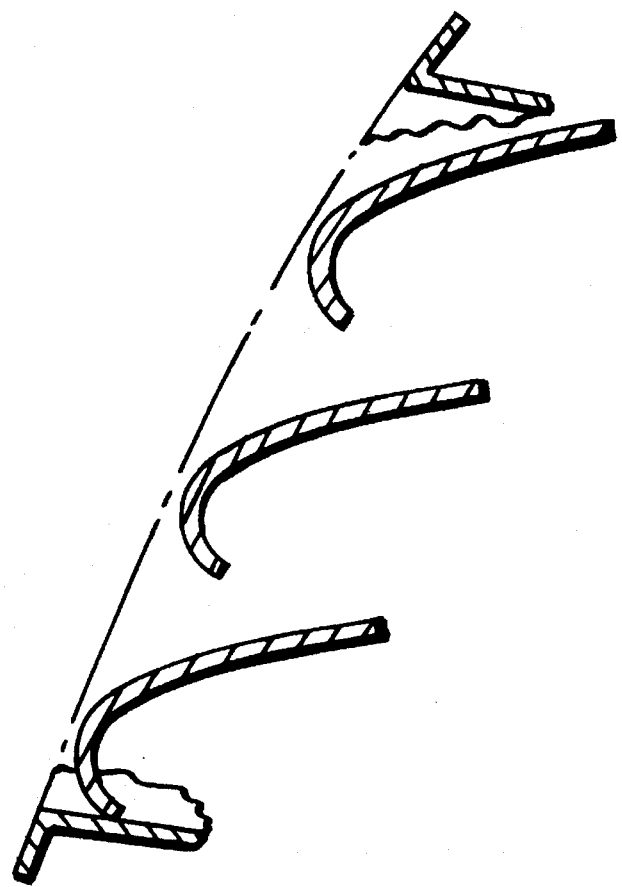
Figure 9:
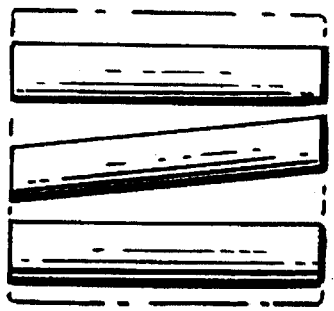

3—3 of FIG. 2;

FIG. 4 is a plan view of a fender of FIG. 1;

FIG. 5 is a perspective view of the side wall rotated out of position;

FIG. 6 is a perspective view of front and rear fenders for double axle wheels embodying the invention;

FIG. 7 is a perspective view of an alternative embodiment of the invention employing an air inlet scoop;

FIG. 8 is a side schematic of a leading section of a fender with blades arrayed in uniform relationship; and FIG. 9 is a front schematic of a leading section of a fender with blades arrayed in non-parallel relationship.

DESCRIPTION OF THE PREFERRED EMBODIMENT(S)

The invention will be described with reference to the left wheels of single and double axle tractors. The structures for the right wheels for the single and double axle vehicles are simply mirror images thereof.

Referring to FIG. 1, a fender is shown generally at 10 and comprises a leading section 12 having a leading edge 14, a top section 11 and a trailing section 16 having a trailing edge 18. The fender also includes a side edge 20 terminating in a U-shaped recess and mounting brackets 22a and 22b which are welded or otherwise secured to the fender 10. The mounting brackets are bolted to the chassis in any suitable manner.

Referring to FIG. 2, the leading section 12 is characterized by an opening 24 in which is received an air scoop 26. The air scoop 26 comprises a substantially rectangular frame 28 having a lip 30 extending outwardly therefrom. Secured in the frame are three horizontal blades spaced in parallel, spaced apart relationship 32a, 32b and 32c respectively. These blades define openings 34a, 34b and 34c, see FIG. 2. The air scoop 26 is secured to the fender 10 by bolting (or otherwise fixing) the lip 30 of the frame to the leading section 12 of the fender.

Figure 3:
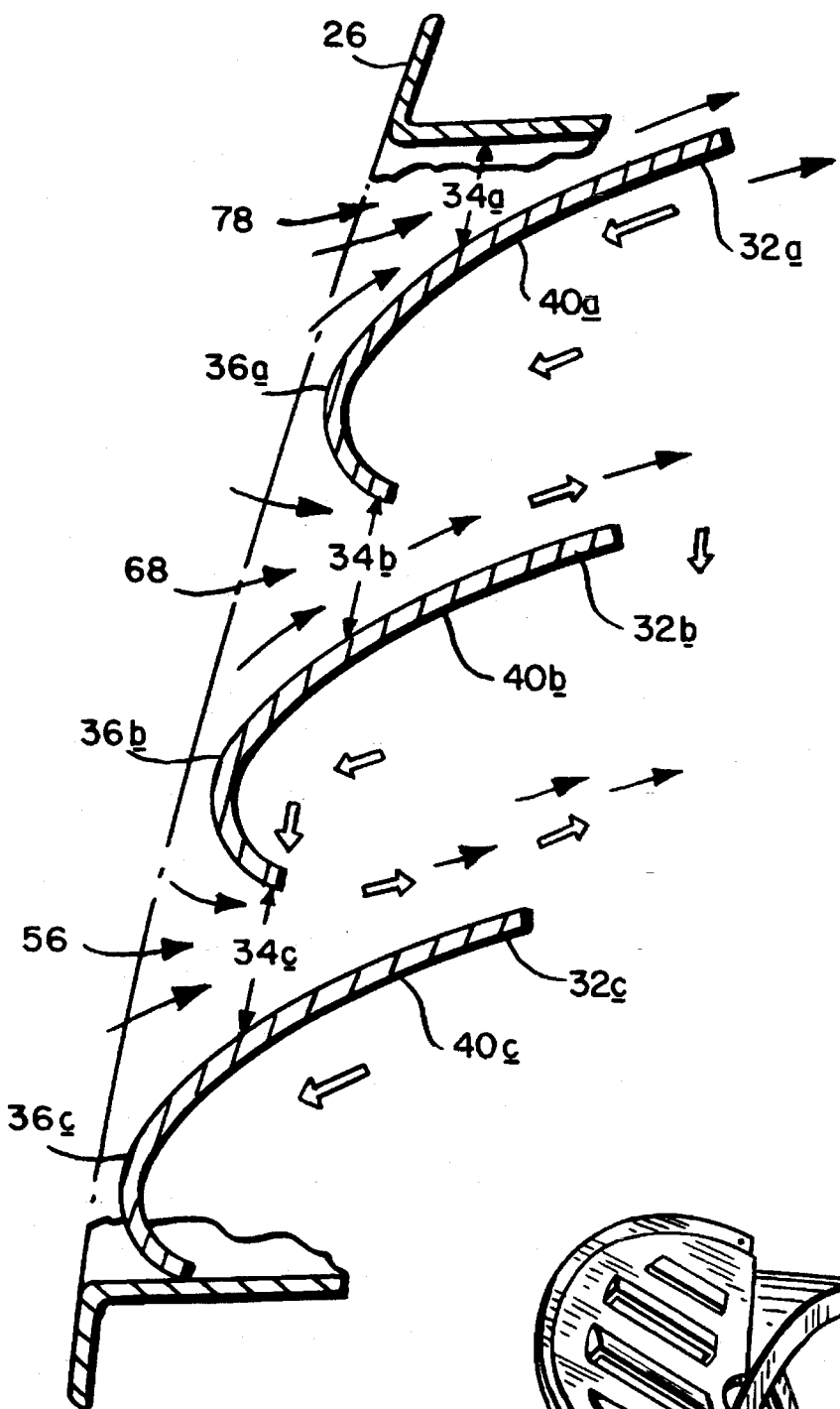
FIG. 3 is a side schematic illustration taken along lines

Referring to FIG. 3, the blades 32a, 32b and 32c of the air scoop 26 are shown more clearly. The blades are parabolic-shaped and comprise outer surfaces 36a, 36b and 36c and inner surfaces 40a, 40b and 40c. The blade openings 34a, 34b and 34c are non-uniform. The opening 34a is smaller than the openings 34b and 34c. *Specifically, the openings are approximately* 1", 1¼", 1½" respectively. The widths of the blades range between 14" to 18". The shape of the blades shown in FIG. 3 correspond to a working example. This spacing ensures a greater air flow in the upper quadrant of the rotating tire. The air flowing over and through the opposed curved surfaces, i.e. through the openings, has an increased velocity compared to flowing over and through flat surfaces. The spray is shown in block arrows and the air flow is shown in linear arrows. This configuration in combination with the top fender or underside of a carriage and a side shield (to be described) pulls a partial vacuum within the fender (leading section, top and side shield) and results in the air carrying moisture exiting the fender at the rear of the fender.

Referring to FIGS. 2 and 4, a side shield 42 is shown and comprises a wall 44 and an upper edge 46 which terminates in an offset lip 48. The side shield 42 includes a bottom edge 50. The offset lip 48 is adapted to be received in the U-shaped recess of the edge 20. The lip 48 is out away at its leading edge at 52.

An upstream louver 54 extends outwardly from the side wall 44 and the louver 54 includes a leading edge 56, and a side wall 58 which define a slot-like aperture 60. Similarly, an intermediate louver 62 extends outwardly from the side wall 44 and includes a leading edge 64 and a side wall 66 which define a slot-like aperture 68. A downstream louver 70 extends outwardly from the side wall 44 and includes a leading edge 72, a side wall 74 which define a slot-like aperture 78. The aperture 68 is greater than aperture 60 and the aperture 78 is greater than the aperture 68. The side louvers are spaced so as to direct the incoming air into the wheel rim and onto the brake drums behind the rim.

Referring to FIGS. 2 and 5, as shown, a spring loaded rod 80 together with an associated spring 82 is secured to the inside surface inner edge 20 of the front fender 10. Secured to the inside of the side shield 42 is a strap 84. The end of the spring loaded rod 80 is journaled to the side shield 42 at 86. The side shield 42 is secured in place by the lip 48 being received in the edge 20 and being locked in place by a cylinder lock 88. When it is necessary to inspect the tire for pressure, tire tread, lug tightness, etc., the lock 88 is released, the side shield rotated downwardly and then moved slightly outwardly from the fender. The spring 82 allows for this flexibility. The side shield is then rotated upwardly, as shown in FIG. 5, to provide access to the tire. The cutaway of the lip 48 at 52 allows for the necessary clearance.

In the operation of the invention, referring to FIG. 3, the air flows through the air scoop 26 and into the control zone, contacting the rotating tire. As previously described, the spray is controlled and directed to the trailing section of the fender. The spray is not cast back through the scoop from the rotating tire. The air also flows through the apertures 60, 68 and 78 in the side shield 42 and is discharged onto the rotating tire and onto the brake assembly. In a preferred embodiment, the apertures are sized in a ratio of approximately 1", 1¼", 1½" front to back to ensure uniform flow of air into the control zone and onto the rotating tire and the brake assembly. Depending upon the size of the tire with which the fender is used and the number and configuration of openings, various ratios among the apertures will be well within the skill of the art.

In tests conducted with the fender of the invention, if the vehicle (fender) is travelling at 95 feet per second (65 mph), the speed at which the air exits the fender at the trailing edge 18 is about 154 feet per second. With earlier fender designs, the centrifugal force of the spray being cast from the rotating wheel actually caused the spray to pass through the openings in the leading portion of the fender. Therefore, as shown in FIG. 3, when the air stream strikes the nose of the fender, the air is directed across the concave surface and into the quadrant and across the lower surface. The flow of the air through the openings for the blades 32a, 32b and 32c prevents the spray from flowing through the opening which was not the case when flat blades per se were used. Further, the concave surface collects the forwardly cast spray from the rotating tire which collected spray (water) is ultimately carried rearwardly and discharged at the rear of the fender.

The air which is deflected downwardly helps to "lock in" the residual water still adhering to the face of the rotating tire and the underside hook traps the water that is being thrown from the spinning tire.

Referring to FIG. 6, the front fender 10 is used in combination with a back fender 10' in a double axle arrangement.

Referring to FIG. 7, a fender 100 is shown. A top blade 102 extends under and is spaced apart from the top section 104 of the fender and defines therewith an air scoop opening 106. The fender 102 and the top section 104 define a flow path of diminishing cross-sectional area such that air flowing through the scoop is compressed. When the air is discharged, it adiabatically expands resulting in a cooling effect. The direction of discharge is such that the adiabatically expanded cooled air is directed onto and between the rotating tires to assist in cooling of the tires and the brakes of the tires.

The blades of the air scoop 26 have been shown in a uniform, parallel, spaced apart relationship. The number of blades can vary and the spacing between the blades can be equal (FIG. 8) or non-uniform (FIG. 3). The blades can be adjustable such as by pinning them to the side walls or by positioning them and then bolting them in place. The blades can also be non-parallel with reference to the axis of the rotating wheel (FIG. 9).

Similarly, the slot-like apertures have been shown in spaced apart, parallel relationship and are dimensioned to proportion the flow of air into the control zone to cool the tire and brake assembly. These slots may assume other geometric configurations as long as the air flow is uniformly distributed into the control zone.

Depending upon the specific configuration of the carriage of the trailer, the wheels themselves may be recessed within a well such as with vans or buses. In this situation, it would not only be impractical but would serve no purpose to attempt to insert the whole fender design within the well. In this design, the side wall per se could be used and attached to the well in a manner that 'skirts' where once secured to cover the rear tires of automobiles for aesthetic purposes.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A fender to control the flow of air about a rotating tire which comprises:

a generally planar leading section spaced apart from and extending generally across a leading upper quadrant of the tire and defining a region therebetween;

a plurality of blades formed in the leading section, the blades spaced apart to define flow passages therebetween, the blades comprising parabolic shaped outer surfaces and concave inner surfaces, the outer surfaces defining therebetween flow paths of diminishing cross section;

the inner surfaces of the blades spaced apart from the rotating tire whereby when a spray is cast forwardly from the rotating tire in the region adjacent the leading section said spray is both redirected downwardly toward the tire and collected by the inner surfaces and subsequently discharged.

2. The fender of claim 1 wherein the blades are spaced apart in uniform parallel relationship.

3. The fender of claim 1 wherein the blades are spaced in parallel non-uniform relationship.

4. The fender of claim 1 wherein the blades are spaced in non-parallel non-uniform relationship.

5. The fender of claim 1 wherein the flow paths increase in size from the upper to the lower portion of the leading section.

6. The fender of claim 1 which comprises a top section which cooperates with the leading section and is spaced apart from and extends across the top portion of the tire, and wherein the top blade extends under and is spaced apart from the top section and defines therewith an air scoop, the air scoop is characterized by a flow passage of diminishing cross sectional area which results in the adiabatic discharge of the air flowing through the air scoop onto the rotating tire and associated brake assembly.

7. The fender of claim 1 wherein the fender comprises a trailing portion spaced apart from and which extends generally across the trailing upper quadrant of the tire, at least a portion of the spray being discharged downwardly from the trailing portion.

8. The fender of claims 1 or 6 which comprises first and second fenders arrayed in tandem relationship for a dual axle vehicle.

9. A fender to control the flow of air about a rotating tire which comprises:

a generally planar leading section spaced apart from and extending generally across a leading upper quadrant of the tire and defining a region therebetween;

a plurality of blades formed in the leading section, the blades spaced apart to define flow passages therebetween, the blades comprising parabolic shaped outer surfaces and concave inner surfaces, the outer surfaces defining therebetween flow paths of diminishing cross section;

the inner surfaces of the blades spaced apart from the rotating tire whereby when a spray is cast forwardly from the rotating tire in the region adjacent the leading section said spray is both redirected downwardly toward the tire and collected by the inner surfaces and subsequently discharged;

a side shield to cool the tire and associated brake assembly which side shield comprises:

means to maintain the shield in spaced apart relationship from the rotating tire, the shield lying in a plane substantially perpendicular to an axis of the rotating tire; and a plurality of louvers formed in the shield comprising at least a leading and trailing louver, the louvers non-uniformly proportioned such that the rate of the air discharged from the louvers is substantially equal to ensure uniform distribution of air flowing onto the tire and associated brake assembly.

10. A fender to control the flow of air about a rotating tire which comprises:

a generally planar leading section spaced apart from and extending generally across a leading upper quadrant of the tire and defining a region therebetween;

a plurality of blades formed in the leading section, the blades spaced apart to define flow passages therebetween, the blades comprising parabolic shaped outer surfaces and concave inner surfaces, the outer surfaces defining therebetween flow paths of diminishing cross section;

the inner surfaces of the blades spaced apart from the rotating tire whereby when a spray is cast forwardly from the rotating tire in the region adjacent the leading section said spray is both redirected downwardly toward the tire and collected by the inner surfaces and subsequently discharged;

a top section which cooperates with the leading section and is spaced apart from and extends across the top portion of the tire, and wherein the top blade extends under and is spaced apart from the top section and defines therewith an air scoop, the air scoop characterized by a flow passage of diminishing cross sectional area which results in the adiabatic discharge of the air flowing through the air scoop onto the rotating tire and associated brake assembly a side shield to cool the tire and associated brake assembly which side shield comprises:

means to maintain the shield in spaced apart relationship from the rotating tire, the shield lying in a plane substantially perpendicular to an axis of the rotating tire; and a plurality of louvers formed in the shield comprising at least a leading and trailing louver, the louvers non-uniformly proportioned such that the rate of the air discharged from the louvers is substantially equal to ensure uniform distribution of air flowing onto the tire and associated brake assembly.

11. The fender of claim 10 wherein the fender comprises the trailing portion spaced apart from and which extends generally across a trailing upper quadrant of the tire, at least a portion of the water being discharged downwardly from the trailing portion.

* * * * *